United States Patent
Kayal et al.

(10) Patent No.: US 11,138,654 B1
(45) Date of Patent: Oct. 5, 2021

(54) METHOD AND SYSTEM FOR DYNAMIC TRAFFIC SHAPING OF DEALS TO REDUCE SERVER STRESS

(71) Applicant: Amazon Technologies, Inc., Seattle, WA (US)

(72) Inventors: Akash Kayal, Seattle, WA (US); Michael James McInerny, Seattle, WA (US); Jane Mooney, Seattle, WA (US); Brandon William Porter, Yarrow Point, WA (US); Darryl Havens, Seattle, WA (US); Donald Arthur Parsons, Seattle, WA (US); Robert Karl Beckmeyer, Sammamish, WA (US); Luan Khai Nguyen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 429 days.

(21) Appl. No.: 15/661,484

(22) Filed: Jul. 27, 2017

(51) Int. Cl.
  *G06Q 30/06* (2012.01)
  *G06F 16/9535* (2019.01)
  (Continued)

(52) U.S. Cl.
  CPC ..... *G06Q 30/0643* (2013.01); *G06F 16/9535* (2019.01); *G06Q 30/0283* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 2006/0230144 A1* | 10/2006 | Shah | H04L 43/16 709/225 |
| 2007/0150370 A1* | 6/2007 | Staib | G06Q 30/0641 705/26.81 |

(Continued)

OTHER PUBLICATIONS

Online return policy & retention go hand-in-hand explains TrueShip's newest white paper. (Jan. 18, 2016). Internet Wire Retrieved from https://dialog.proquest.com/professional/docview/1760084700?accountid=161862 (Year: 2016).*

*Primary Examiner* — Allison G Wood
*Assistant Examiner* — Ashley D Preston
(74) *Attorney, Agent, or Firm* — Kilpatrick Townsend & Stockton LLP (57) ABSTRACT

Techniques described herein include systems and methods for throttling requests for content to reduce stress on a check out pipeline associated with an electronic marketplace thereby avoiding overstressing a server to the point of no longer processing requests from users. In embodiments, first information may be maintained that identifies a ranking for a plurality of items based on a score. A predicted velocity of content requests about the plurality of items may be maintained and second information about an actual velocity of content requests about the plurality of items may be received. In response to a request for content, a portion of items may be identified based on the scores associated with said portion and partition the portion into a number of groups or partitions based on the predicted velocity and the second information. A data object that comprises the portion of items associated with a partition may be generated.

10 Claims, 8 Drawing Sheets

(51) Int. Cl.
*G06Q 50/00* (2012.01)
*G06Q 30/02* (2012.01)

(56) References Cited

U.S. PATENT DOCUMENTS

2010/0094729 A1* 4/2010 Gray .................. G06Q 30/06
 705/26.1
2010/0262495 A1* 10/2010 Dumon ................ G06Q 30/02
 705/14.54

* cited by examiner

METHOD AND SYSTEM FOR DYNAMIC TRAFFIC SHAPING OF DEALS TO REDUCE SERVER STRESS

BACKGROUND

In electronic environments, it is common for multiple users to send requests to a common resource, such as a host machine or server that is operable to process the request and perform at least one associated action. For example, processing an item check-out request for a user wishing to order an item online, perhaps offered by an electronic marketplace. As the number of users and requests increases, the chance of exceeding a maximum number or rate of allowable requests increases as well. Exceeding a maximum number or rate of allowable or healthy requests that can be safely processed can negatively impact the quality of service that the users receive, as the average response time for the requests may increase leading to some requests timing out, or the system might crash and cause other problems. For example, users attempting to complete a purchase at an electronic marketplace may be presented with an error and lose interest, miss out on a deal, and therefore have a negative user experience. Conventional solutions to this problem include limiting the number of requests from a given requestor over a given period of time, commonly referred to as throttling. For example, a group or type of user may be given a hard limit for resource requests. However, conventional solutions such as those described above may be too limiting and result in a non-optimal use of resources while also lacking flexibility to respond to request demands.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods herein provide solutions for dynamically shaping traffic to reduce stress on network components such as computer components associated with implementing of an item or service order provider. In particular, various approaches discussed herein provide for dynamic traffic shaping of traffic flows to components associated with an item or service provider such that the components are appropriately utilized without exceeding maximum tolerance levels that would result in errors presented to users or catastrophic system failures. Example computer components or components associated with an item or service provider may include a server, a database, network components such as routers or switches, or distributed computing resources such as cloud environment resources and virtual instances implemented by cloud environment resources. In accordance with at least one embodiment, a service provider computer implementing the traffic shaping features described herein can implement one or more levers, either manually or automatically, to dynamically shape traffic requests and avoid overstressing or exceeding a threshold of requests that would cause system failures. Such levers can be implemented to adjust and shape traffic requests dynamically according to various conditions and provide a more fine-grained approach than for hard limits or step function-based throttling limits. Moreover, rules or polices can identify one or more thresholds that can be compared to identify an appropriate lever utilization or even the amount of traffic reduction that should occur. In accordance with at least one embodiment, based on the check-out request velocity and/or item information, levers can be implemented to drive traffic up in an effort to incentivize certain products or services for consumers and more efficiently utilize resources of an item or service provider. As used herein a "check-out request" includes information from one or more components involved in presenting, receiving, and processing item and/or service offers associated with an electronic marketplace from a user device of a user and/or any suitable requests received by computer components such as servers, network components, databases, or cloud computing resources such as virtual instances. As an example, a check-out request can include an order initiated by a user browsing a web page offering an item associated with an electronic marketplace.

In accordance with at least one embodiment, the traffic shaping feature may include a sampling lever that identifies a portion of content or item deals that are sampled from to populate one or more number of groups or partitions. The groups or partitions of item deals may be utilized to populate data objects to present item and/or service deals to user devices and user interfaces that request content. The sampled item deal group (i.e., the portion of content) may include a certain percentage of the total item or service deals offered by an electronic marketplace. The electronic marketplace may still offer each item deal for the items or services offered by the electronic marketplace but the data object that is presented to the user is populated using only a certain percentage of the total item deals offered by the electronic marketplace. By implementing such a feature the user may have to manually search, provide additional interactions such as clicks or input with a user interface, or other suitable actions to find the appropriate item deal. The time it takes for any given user to find an item deal or service not included in the data object (i.e., offered by the electronic marketplace but not populated in the data object presented to the user) can reduce the stress on components implementing the check-out requests. In aggregate, a portion of users may find the desired deals included in the generated data object. However, a portion of users who do not find their desired deals included in the generated data object spending time to search or otherwise look for their own desired deals can provide valuable stress reduction to components implementing the check-out requests. For example, when the components are attempting to service 40,000 requests per minute, a reduction by 5000 requests per minute by the minority of users searching for a deal not included in the data object can provide for maximal use of components implementing the check-out requests without exceeding maximal or unhealthy stress levels of said components.

In accordance with at least one embodiment, the traffic shaping feature may include a shifting lever that adjusts the order of presentation of a number of item deals by a certain number of positions. For example, a data object that comprises one or more item or service deals that will be presented to a user may have the original order of presentation, perhaps from most popular to least popular, shifted by a certain number of positons. To further illustrate the example, if an item deal pool of ten item deals were ranked 1-10 with an original order of presentation allowing for five item deals to be presented at once, item deals 1-5 would be presented as the data object is transmitted and presented via a user interface. However, when the shifting lever is implemented, the order of presentation may be shifted a number of positions such that item deals 9, 10, 1, 2, and 3 are presented as the data object is transmitted and presented via the user interface. The user may interact with the data object to scroll or search for the other deals included in the data object (e.g., in the example above, the user could scroll to the right two positions two view item deals 1-5). The time savings of the user interacting with the data object, such as an item deal widget with scrolling capability, may provide valuable time to reduce stress on components implementing the check-out requests for items or services offered by an electronic marketplace. As with the sample lever above, the same item or service deals are offered by the electronic marketplace but the user may have to search or interact with an object, which may take a second or two, and provide the required reduction in check-out requests processed by corresponding components such that a velocity of requests is kept within or under certain thresholds maintained by the electronic marketplace. In accordance with at least one embodiment, the determination to invoke one of the traffic shaping feature levers may be based on a comparison of information about an actual velocity of requests received by a computer component versus a predicted velocity of requests received by the computer component, the actual velocity of requests received by the computer component, the predicted velocity of requests received by the computer component, and/or any of the above data points further compared to one or more thresholds.

In accordance with at least one embodiment, the traffic shaping feature may maintain a predicted velocity rate of check-out requests for any given period of time and/or for certain item or services deals. The predicted velocity rate of check-out requests may be determined based on historical check-out requests data, user preferences, or other suitable information obtained by an electronic marketplace offering items and services. The traffic shaping feature may include communicating with the components implementing the check-out requests to obtain an actual velocity rate of check-out requests that corresponds to the actual velocity rate of check-out requests that are being processed by any one component or the entire system processing the check-out requests at any given time. In embodiments, the shifting or sampling lever may be automatically invoked or implemented by the traffic shaping feature based on the difference between the predicted velocity rate of check-out requests and the actual velocity rate of check-out requests. In accordance with at least one embodiment, the traffic shaping feature may maintain one or more thresholds that identify certain stress loads or conditions which may be associated with a stable check-out request rate, a slow check-out request rate, or a dangerous check-out request rate associated with overloading or overstressing the components processing the check-out requests. The invoking or implementing of the traffic shaping features described herein may be based on the predicted rate of velocity of check-out requests, the actual velocity rate of check-out requests, and one or more thresholds. For example, the two velocity rates may be compared and if one velocity rate exceeds the other by a certain threshold then one or both of the traffic shaping feature levers may be invoked to reduce stress on appropriate check-out request components.

In accordance with at least one embodiment, the traffic shaping feature may include a cost function score that represents the monetary cost for storing or not selling an item or service offered by an electronic marketplace. The cost function score may be based on various data points such as the customer return cost, mark down price, storage cost, storage space assignment, or other suitable information. The cost function score may be utilized to adjust or modify a score associated with each item or service deal maintained by an electronic marketplace. For example, each item or deal offered by an electronic marketplace may be assigned a score that represents the likelihood that an item will sell or be purchased by a given user. In embodiments, the traffic shaping feature may rank the item deals based on each item deals respective score. This in turn drives the item deals that are included in the generated data object when implementing the sample lever or the shifting lever. In embodiments, the cost function score may also modify the item deals included in a generated data object that is presented to a user via a user interface by adjusting a given item deal ranking. For example, an item deal that has a lower score may be ranked lower in a given set of item deals. However, upon calculating the cost function score for the item, the item deal may be adjusted in the ranking such that when either the shifting or sampling lever is implemented, the item deal has a greater chance of being presented to the user and therefore purchased or ordered.

The processes and systems described herein may be an improvement on conventional traffic reducing methods. For example, conventional traffic reducing methods rely on an environment implementing a single host or a limited amount of capacity for processing requests. However, conventional solutions, such as hard limit resource requests, are unsuited for situations where an amount of available resource capacity can change over time. Hard limits or fixed throttling caps do not provide any flexibility to adapt to changing conditions. The improvements described herein can enable systems to dynamically shape traffic, whether to reduce traffic to reduce stress on components, or increase traffic to provide efficient use of components, by dynamically implementing the traffic shaping features described herein. As resource capacity changes, various traffic shaping levers may be implemented or not implemented as necessary to reduce stress or increase traffic to appropriate components. Further, by implementing the improvements described herein, a service may avoid providing an error, system failure, or other similar message due to throttling or denying a user access to a resource. Instead, by implementing the features described herein, the reduction gained by users searching for item deals or interacting with a data object to find the desired item deal can provide the required stress reduction while still provide check-out request service to each user.

Figure 1:
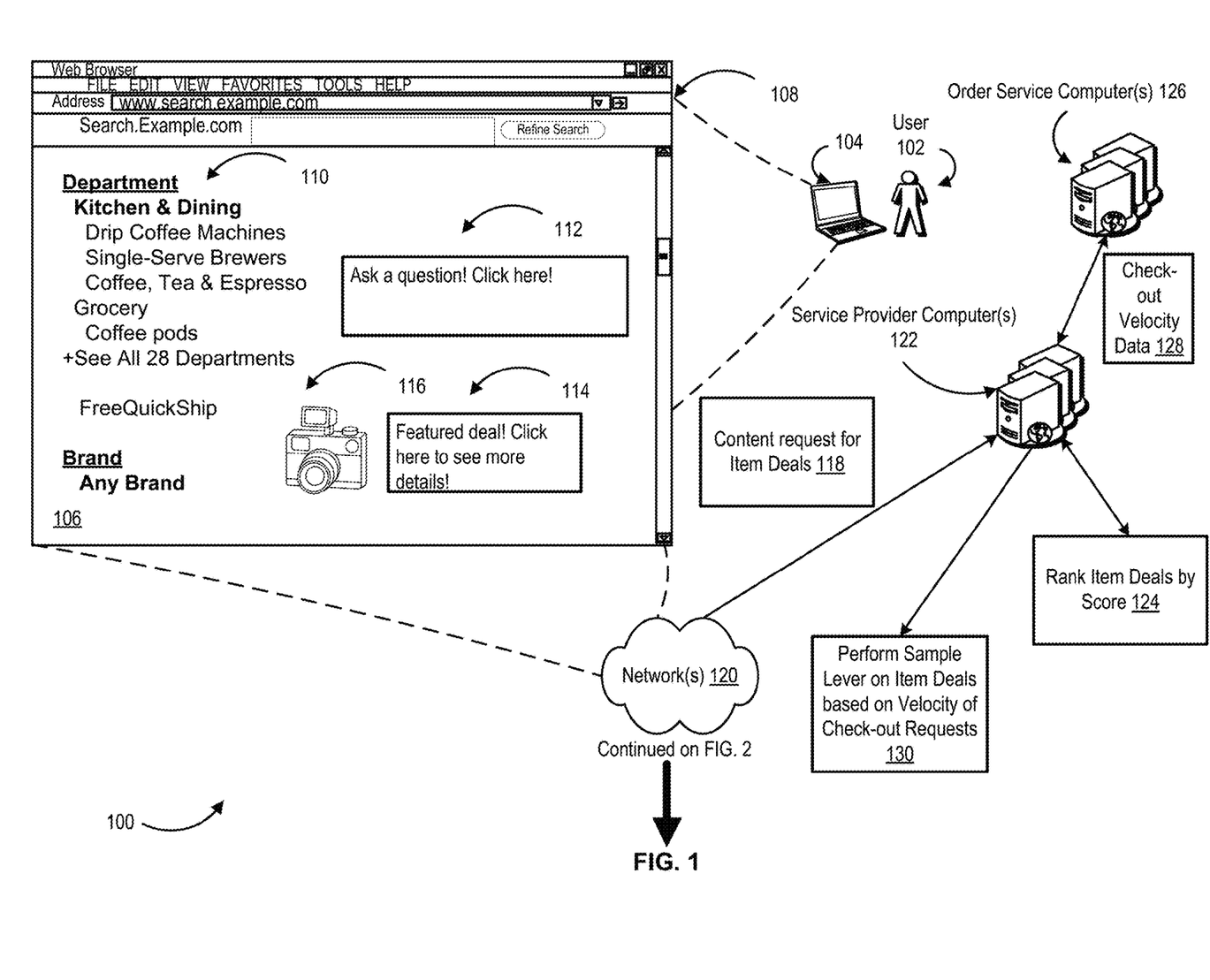
FIG. 1 illustrates an example workflow of a traffic shaping feature, in accordance with at least one embodiment.

FIG. 1 illustrates an example workflow of a traffic shaping feature, in accordance with at least one embodiment. The workflow 100 of FIG. 1 may include a user 102 interacting with a user device 104 to view or otherwise interact with a web page 106 presented via a web browser 108. The web page 106 may be provided by an electronic marketplace and represent an landing page or home page of an electronic marketplace that includes item categories 110 and an question and answer feature 112 about items offered by the electronic marketplace. In embodiments, the web page 106 may also populate a data object 114 that represents a featured item deal and an image of the featured deal 116. The data object 114 may include item or service deals, limited time offers, or other suitable deals offered by the electronic marketplace whether they are time or quantity constrained. In accordance with at least one embodiment, the web page 106 may transmit a content request for item deals 118, via networks 120, to service provider computers (service provider computer) 122 implementing the traffic shaping features described herein. In embodiments, the service provider computer 122 may calculate a score for each item deal of a plurality of item deals where the score represents a likelihood that a consumer would order the associated item deal. The service provider computer 122 may rank the item deals by score at 124.

In accordance with at least one embodiment, the service provider computer 122 may be in communication with an order service computer 126 that is configured to obtain or determine a check-out velocity rate or check-out velocity data 128 representing the velocity of order requests attempting to be fulfilled at any given time, for example per second, minute, or hour. The check-out velocity data 128 may be a good indicator for components processing the check-out requests for items or services offered by an electronic marketplace. The higher the check-out velocity data 128, the more likely the components are under stress or likely to exceed a safe threshold. It should be noted that although FIG. 1 illustrates the service provider computer 122 in communication with another entity (i.e., order service computer 126) to obtain or receive the check-out velocity data 128, in some embodiments such metrics may be obtained or determined by one entity such as the service provider computer 122. It should also be noted that although FIG. 1 discusses an order service computer 126 and check-out velocity data 128 concerning check-out requests by consumers attempting to order items and services provided by an electronic marketplace, features described herein may be applied to any suitable computer resources that processes any suitable requests such as a networked database, server, cloud environment computing resources, etc., that process access requests, read/write requests, and other suitable requests. The traffic shaping feature described in the present disclosure is capable of reducing the velocity of any of the above described requests by implementing the levers included in the traffic shaping featured including a sampling lever, a shifting lever, or a cost function lever. Further, in some embodiments, the service provider computer 122 may maintain one or more thresholds to compare the check-out velocity data 128 in determining whether to invoke the traffic shaping features described herein including one or both of the sample lever or the shifting lever. The workflow 100 of FIG. 1 includes the service provider computer 122 performing the sample lever on item deals based on the velocity of check-out requests at 130. As described herein, the sample lever may identify a portion of the total item deals with which to partition and populate one or more partitions or groups. The groups or partitions of items may be utilized to generate a data object that presents some item deals to a user while keeping other item deals that are still offered by an electronic marketplace hidden thereby causing the user to search or otherwise spend time interacting with the web page 106 to find the desired deals. The time spent in searching for the desired deals can provide relief to components processing the check-out requests such as the order service computer 126 and in aggregate over a large population of users serve to reduce the check-out velocity data 128 to a level that is below one or more thresholds associated with overall system or component health.

Figure 2:
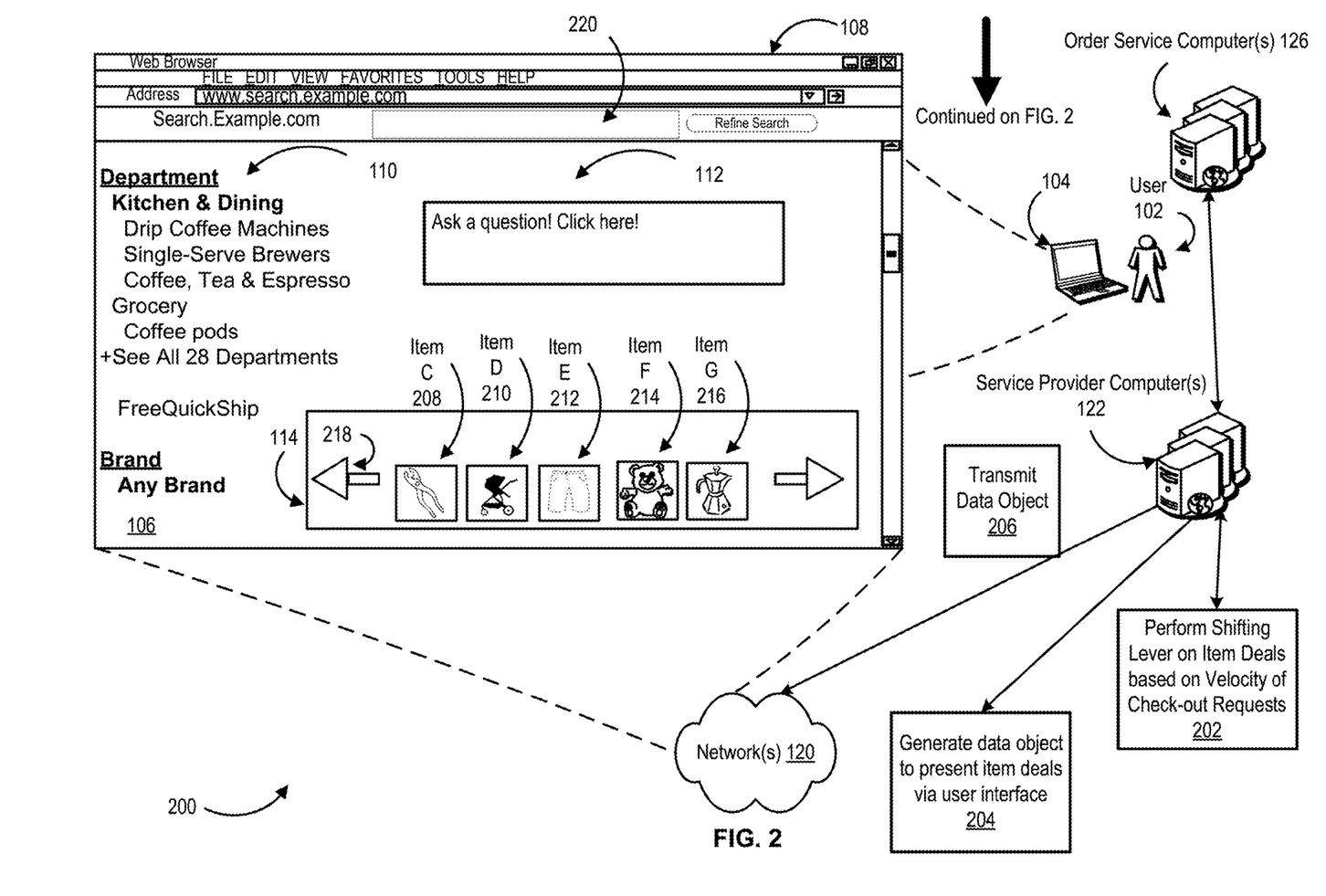
FIG. 2 illustrates an example workflow of a traffic shaping feature, in accordance with at least one embodiment.

FIG. 2 illustrates an example workflow of a traffic shaping feature, in accordance with at least one embodiment. The workflow 200 of FIG. 2 which continues the workflow 100 of FIG. 1 depicts the service provider computer 122 performing the shifting or shift lever on item deals at 202 based on the velocity of check-out request data 128. In embodiments, performing or invoking the shifting lever on the item deals 202 can be performed on the ranked item deal list generated by the service provider computer 122 and/or on the partitioned group of item deals resultant from the sample lever invocation 130 from FIG. 1. As described herein, invoking or performing the shifting lever on item deals 202 comprises shifting or moving the order of presentation of item deals in a generated data object by a certain number of positions based on the velocity of check-out request data 128. The resultant shifted item deal order of presentation is different than if the order of presentation corresponded to merely the rank of the items according to their associated scores. For example, if an item deal pool includes item deals 1-10 each decreasing in score, a conventional data object may present the first five deals (item deals 1-5). Upon invoking the shifting lever, the order of presentation in the example above would be moved a certain number of positions (e.g., 3) resulting in the first give deals including item deals 8-10, 1, and 2. The shifting lever is described in more detail with reference to FIG. 4.

In accordance with at least one embodiment, the service provider computer 122 may generate a data object to present item deals via a user interface at 204. The generated data object 204 may include item deals that have had the sample lever invoked, the shift lever invoked, or both levers invoked based on the velocity of check-out request data 128. In embodiments, the service provider computer 122 may transmit the data object 206, via networks 120, to update the web page 106 with the data object 114 that includes the selected item deals 208-216. As illustrated in FIG. 2, the data object 114 to include item deals 208-216 and an interactable object 218 enabling the user to scroll or search for more deals included in the data object 114. The data object 114 generated at 204 may include more item deals than those currently presented or presented at any given time via the web page 106 and updated data object 114 to user 102 via user device 104. As described herein, the user may find a desired deal included in item deals 208-216 which would result in no reduced stress or relief to the order service computer 126. However, some portion of users being presented with the data object 114 with item deals 208-216 may not find their desired deal which would result in the users searching for the desired item deals within the data object 114, via a search bar such as 220, or through other means which would provide reduced stress and check-out requests thereby reducing the velocity of check-out requests in the aggregate on the order service computer 126 or other associated components utilized to process check-out requests.

It should be noted that although FIG. 2 illustrates the service provider computer 122 dynamically generated the data object at 204, in some embodiments the service provider computer 122 may pre-generate the data object 114 using the item deal data obtained from the order service computer 126 or an electronic marketplace and the check-out request data 128 obtained at any given time prior to a request for content of item deals at 118. In accordance with at least one embodiment, the service provider computer 122 may be configured to transmit the data object 204 at 206 via networks 120 to one or more social media platforms such as social media web site or one or more other web sites or content requesting entities in the form of an advertisement. In embodiments, the service provider computer 122 may be configured to provide data to update the data objects of item deals provided as advertisements, links, or re-direct objects, based on updated check-out velocity data. As such, the data objects presented as advertisements or recommendations may be dynamically updated based on the current traffic or stress level of components implementing and processing check-out requests for items or services offered by an electronic marketplace. It should be noted that the decision to implement or invoke the shifting lever 202 or sample lever 130 may be performed manually by an entity associated with the service provider computer 122 or electronic marketplace. For example, an administrator may observe the check-out velocity data 128 to decide when and if to implement or invoke either lever 130 or 202. In accordance with at least one embodiment, the service provider computer 122 may delay the transmittal of the data object 206 to the user device 104 by a certain time period based on the check-out velocity data 128. The certain time period may increase as the check-out velocity data 128 indicates a high stress on components processing check-out requests or reduce based on the check-out velocity data 128 indicating low stress on said components.

Figure 3:
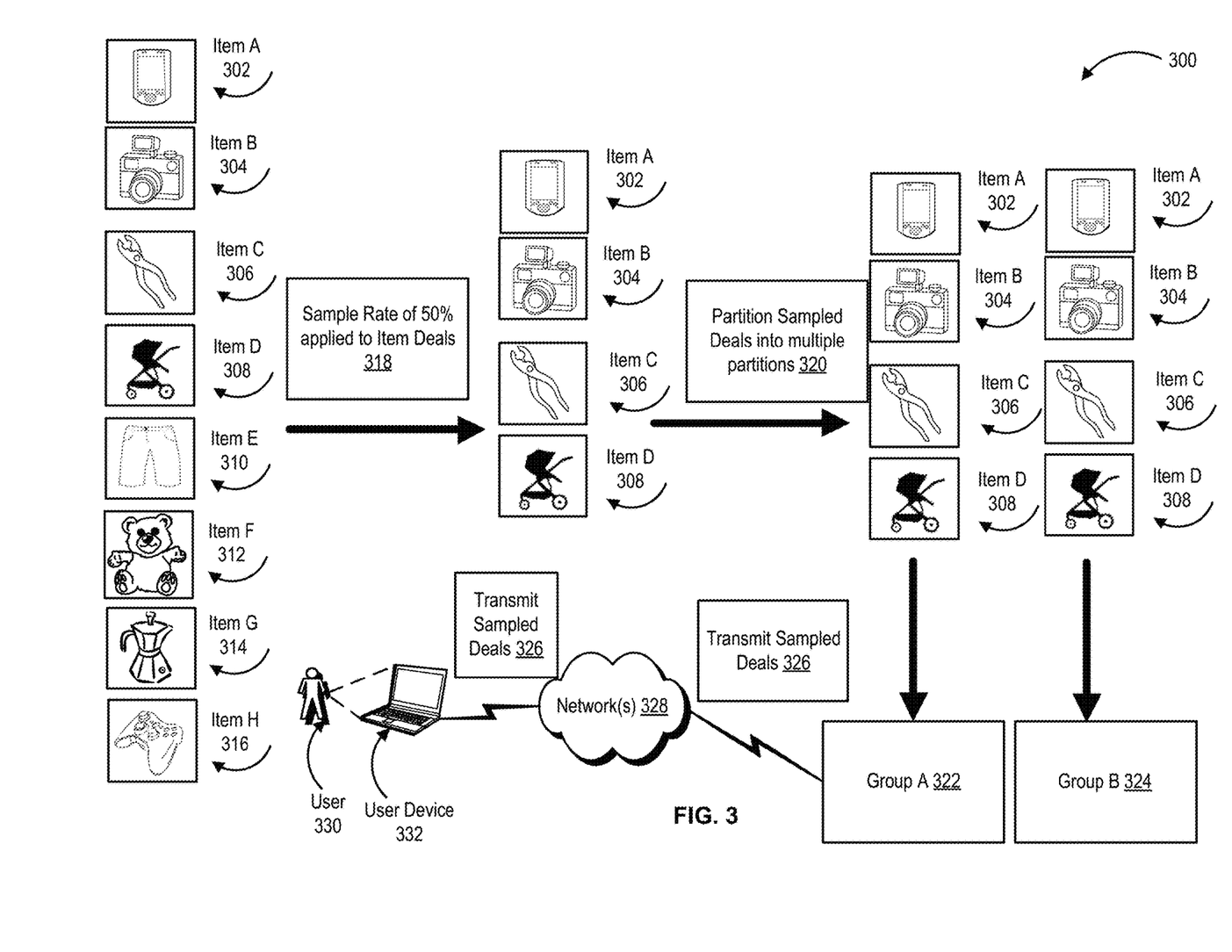
FIG. 3 illustrates an example workflow of a sampling feature for traffic shaping, in accordance with at least one embodiment.

FIG. 3 illustrates an example workflow of a sampling feature for traffic shaping, in accordance with at least one embodiment. The workflow 300 of FIG. 3 illustrates an example sample lever invocation. The workflow 300 includes a sample item deal pool size, in FIG. 3 the item deal pool size includes eight item deals 302-316, each item deal including information corresponding to a specific item or service offered by an electronic marketplace. The item deals 302-316 are ranked from top to bottom based on scores associated with each item deal and representing the likelihood that a given deal would be likely to sell or be ordered by users or consumers. As such, item A deal 302 would have a higher associated score than item C deal 306 and item D deal 308, etc. The workflow 300 includes invoking the sample lever by applying a sample rate to the item deals at 318. For example, the workflow 300 includes invoking a 50% sampling rate to the item deals 302-316 such that item deals 302-308 are selected from the item deal pool of 302-316. In embodiments, various sampling rates may be identified or selected based on the check-out request velocity data and/or the comparison of such data to one or more thresholds. For example, if the check-out request velocity data is very close (e.g., 200 check-out requests) from a given threshold that is associated with system failure, a 10% or 15% sampling rate may be utilized to reduce the velocity of requests.

The workflow 300 of FIG. 3 includes portioning the sampled deals 318 into multiple partitions 320 or groups such as group A 322 and group B 324. In accordance with at least one embodiment, similar to a process described above with reference to FIG. 1, the service provider computers (not pictured) may generate a data object using the sample levered group of item deals (302-308) included in group A 322 and group B 324 to populate the item deals included in the data object for presentation to a user in response to a request for content and based on the check-out request velocity data. For example, the workflow 300 of FIG. 3 illustrates transmitting the sampled deals at 326, via networks 328, to user 330 via user device 332. In embodiments, the data object may be configured to be presented via a user interface of user device 332 such as via an application, web browser, or other system browser of user device 332 for interaction by user 330. As described herein, although the data object comprises item deals 302-308, the user 330 may interact with a user interface, web page, or other interface to search for or otherwise manually look up the other item deals 310-316. However, as the user spends time to search for the item deals 310-316 offered by an electronic marketplace, the stress on components processing check-out requests is reduced as the user is not actively submitting a check-out request but is instead looking for the desired deals thereby providing relief or a lower number of check-out requests to be received by components processing orders. In accordance with at least one embodiment, the sampling rate 318 may be randomly selected by the service provider computers or manually specified by an entity associated with the service provider computer and/or electronic marketplace. The items deals selected (e.g., item deals 302-316) for inclusion in the partitioned sampled deals 320 may also be randomly selected such that group A 322 may include item deals that are different from group B 324 but of the same sample size (i.e., 50%). In embodiments, the ranking of the item deals 302-316 may be further modified by the cost function score described above. The ranking of each item deal may be modified as the cost function score modifies the ranking score associated with each item deal which will in turn affect the items selected according to the sample rate at 318 and for further inclusion or partitioning into groups A and B 322 and 324 respectively.

Figure 4:
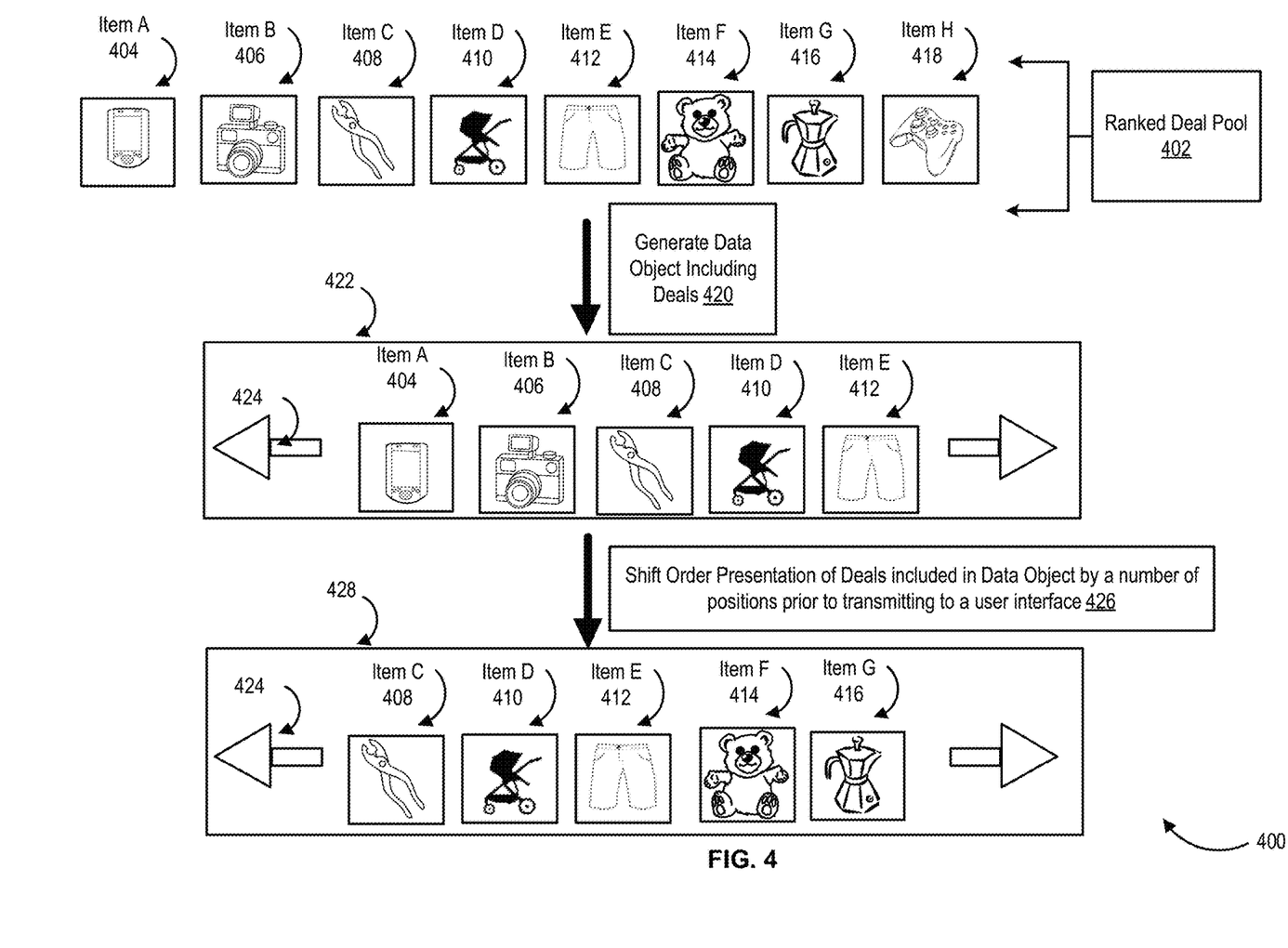
FIG. 4 illustrates an example workflow of a shifting feature for traffic shaping, in accordance with at least one embodiment.

FIG. 4 illustrates an example workflow of a shifting feature for traffic shaping, in accordance with at least one embodiment. The workflow 400 of FIG. 4 depicts a ranked deal pool 402 that includes item deals 404-418 determined based on scores associated with each item deal as described herein. In FIG. 4 the item deals decrease in rank from left to right such that item deal A 404 has a higher score than item deal B 406, item deal C 408, etc. The workflow 400 of FIG. 4 includes generating a data object that includes deals 420. In embodiments, the resultant data object 422 may include each item deal 404-418 or may include a sampled size of item deals resultant from invoking the sample lever as described above. The data object 422 may be configured to present a set number of item deals via an interactable object of a user interface such as a web page browser or a native application of a user device. The data object 422 may include an interactable object 424 or other input mechanism that enables a user to scroll left and right through the item deals 404-412 and more item deals 414-418 of data object 422.

As such, the data object 422 presented to a given user may include an order of presentation that adheres to the ranking of the item deals according to their respective scores. Such a data object may be generated and transmitted during periods of low stress on components implementing check-out requests (i.e., the velocity of check-out request data is low, below a certain threshold, or within parameters of a predicted velocity of check-out requests previously determined). The workflow 400 of FIG. 4 includes invoking the shifting lever at 426 such that the order of presentation of deals included in the data object is shifted by a number of positions prior to transmitting the data object to a user interface and/or user device. In embodiments, the number of positions to shift the order of presentation of deals included in the data object may be determined based on the check-out velocity data or manually specified by an entity associated with the service provider computers and/or electronic marketplace. The resultant data object 428 depicted in FIG. 4 includes item deals 408-416 indicating that the original order of presentation (i.e., an order of presentation based solely on the rank of the item deal) has been shifted to the left two positions resulting the first presented item deals of 408-416 being displayed or presented to a user interface. The item deals hidden by the shifting lever (item deals 404 and 406) are still offered by the electronic marketplace and supported (e.g., searchable and configured to enable ordering) by the data object 428. However, a user would have to utilize the interactable object 424 to scroll or search for the desired deals thereby providing relief and reduced stress to the components processing check-out requests as the user may spend seconds or minutes looking for the desired deal included in the data object 428 with the shifted order of presentation.

Figure 5:
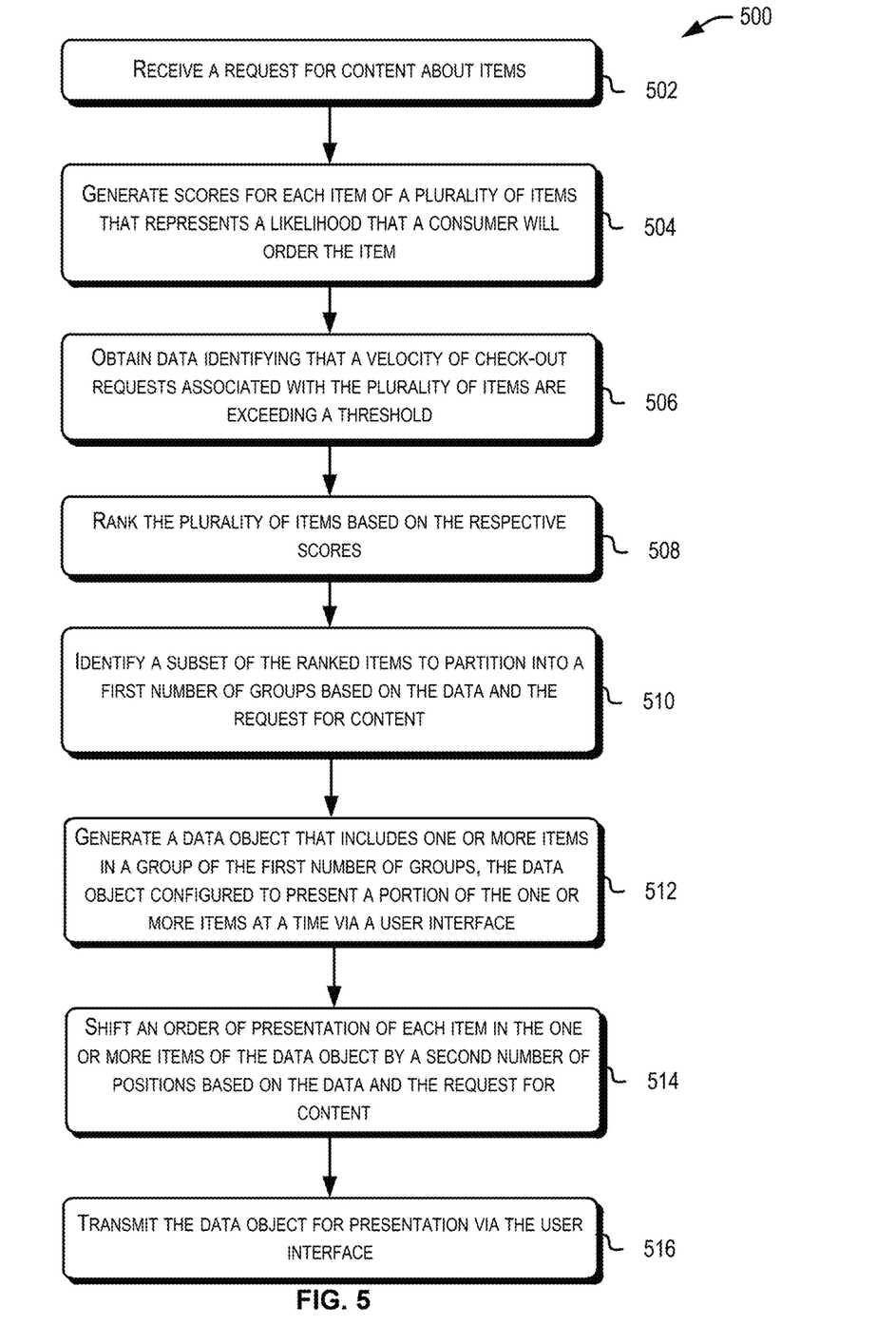
FIG. 5 illustrates an example flow chart for a traffic shaping feature, in accordance with at least one embodiment.
Figure 6:
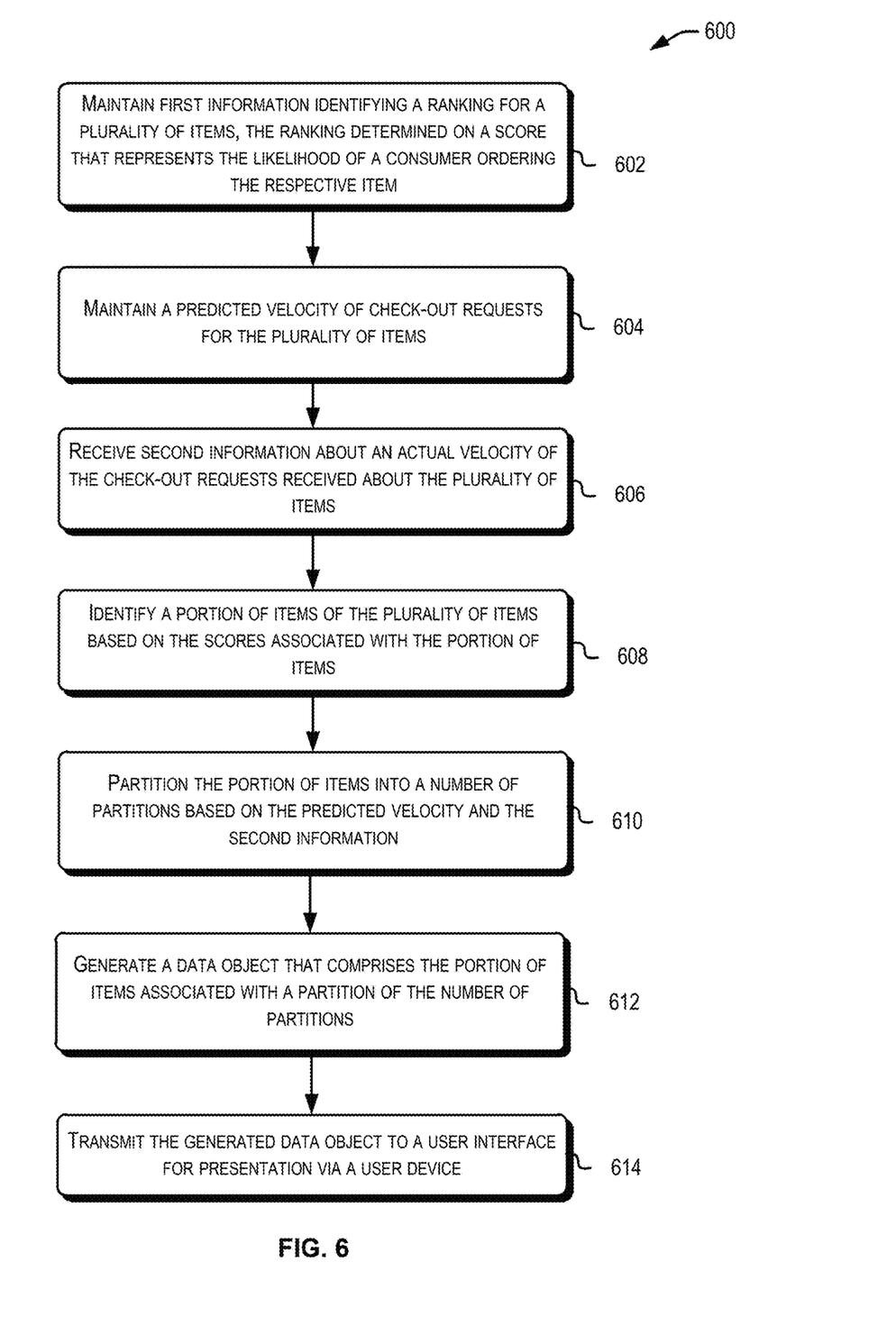
FIG. 6 illustrates an example flow chart for a traffic shaping feature, in accordance with at least one embodiment.

FIGS. 5 and 6 illustrate example flow charts for a traffic shaping feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
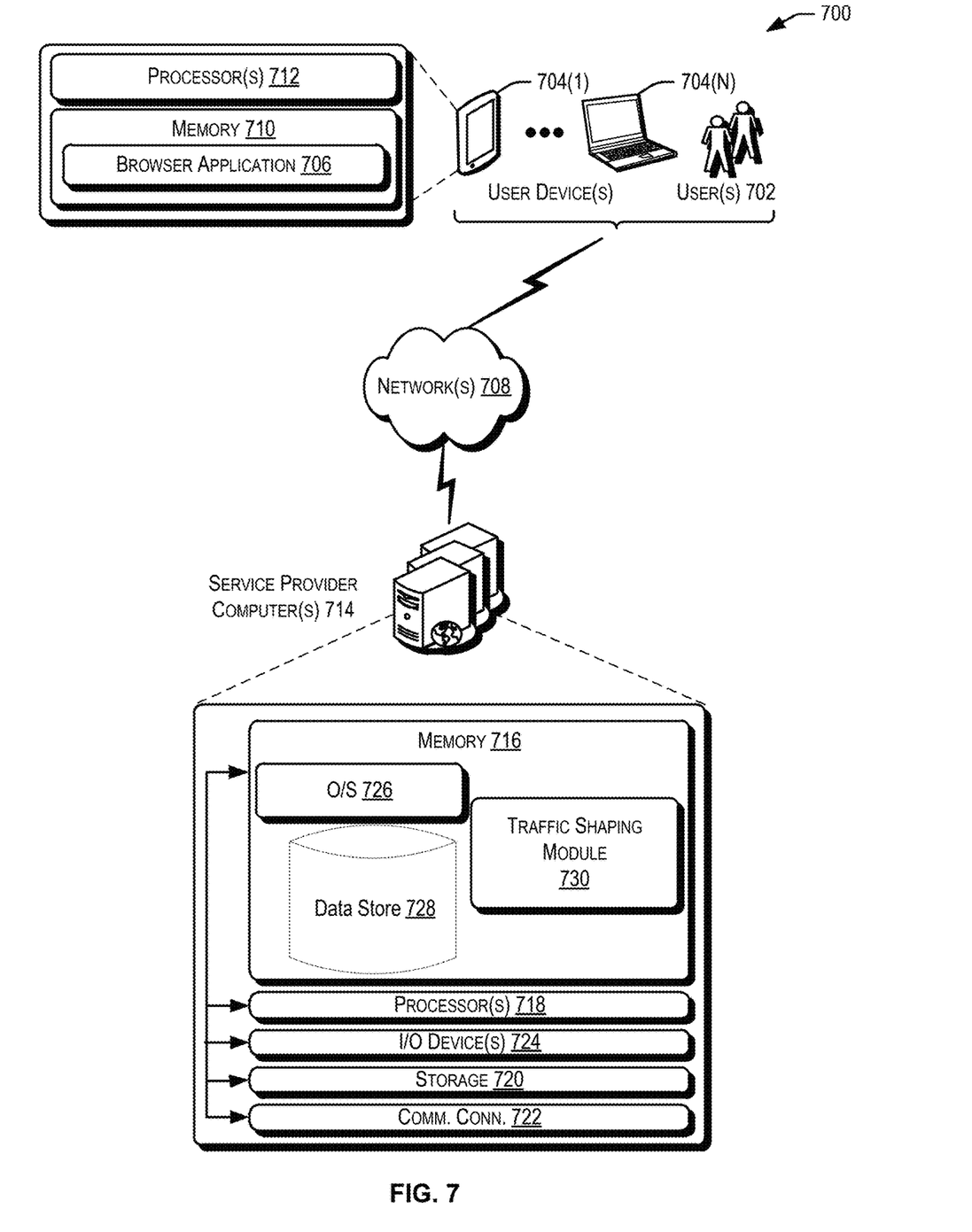
FIG. 7 illustrates an example architecture for implementing a traffic shaping feature, in accordance with at least one embodiment.

In some examples, service provider computer (service provider computers 122 and 714) utilizing at least the traffic shaping module 730 depicted in FIGS. 1, 2, and 7 may perform the processes 500 and 600 of FIGS. 5 and 6. In FIG. 5, the process 500 may include receiving a request for content about items at 502. For example, a user may use a web browser to load a web page provided by an electronic marketplace that offers a variety of items and services and maintains one or more item and/or service deals. The process 500 may include generating scores for each item of a plurality of items that represents a likelihood that a consumer will order the item if presented to the consumer at 504. The process 500 may include obtaining data identifying that a velocity of check-out requests associated with the plurality of items are exceeding a threshold at 506. In embodiments, a service provider computer implementing the traffic shaping features described herein may maintain one or more thresholds associated with component health or stress based on a velocity of requests being processed at any given time.

The process 500 may include ranking the plurality of items based on their respective scores at 508. In some embodiments, the ranking of the plurality of items may be modified by the cost function score described herein. The process 500 may include identifying a subset of the ranked items to partition into a first number of groups based on the data and the request for content at 510. For example, the sample lever may be invoked based on the data identifying a high velocity of check-out requests being processed at a given time. As such, the ranked item deals may be sampled according to a given percentage (e.g., 50%) and the resultant item deals split into a certain number of groups or buckets for use in generating data objects about item deals. The process 500 may include generating a data object that includes one or more items in a group of the first number of groups where the data object is configured to present a portion of the one or more items at a time via a user interface at 512. The data object may be configured to present a set or specific number of item deal information such as five item deals at a time. The process 500 may include shifting an order of presentation of each item in the one or more items of the data object by a second number of positions based on the data and the request for content at 514. For example, the service provider computer may invoke the shifting lever to modify the order of presentation of the item deals included in the data object such that a user may have to spend some time interacting with the object (e.g., searching or scrolling) to find the desired deal and therefore provide a reduction in check-out requests being handled by associated components. The process 500 may conclude at 516 by transmitting the data object for presentation via a user interface.

The process 600 of FIG. 6 may include maintaining first information that identifies a ranking for a plurality of items where the ranking is determined based on a score associated with each item that represents a likelihood of a consumer ordering a respective item at 602. The process 600 may include maintaining a predicted velocity of check-out requests for the plurality of items at 604. The process 600 may include receiving second information about an actual velocity of the check-out requests received about the plurality of items at 606. For example, components implementing and processing item and service order requests may communicate the actual velocity of the check-out requests being received and processed at any given time. The process 600 may include identifying a portion of items of the plurality of items based on the scores associated with the portion of items. For example, the sampling lever may be invoked based on the predicted velocity of check-out requests and the second information. The process 600 may include partitioning the portion of items into a number of partitions based on the predicted velocity and the second information. In some embodiments, the particular item deals included in each partition or group may be randomly selected. In still some embodiments, the particular item deals included in each partition or group may be based on the ranking of the items and the sampling rate applied as described herein. The process 600 may include generating a data object that comprises the portion of items associated with a partition of the number of partitions at 612. The process 600 may conclude at 612 by transmitting the generated data object to a user interface for presentation via a user device at 614.

FIG. 7 illustrates an example architecture for implementing a traffic shaping feature, in accordance with at least one embodiment. In architecture 700, one or more users 702 (e.g., customers, users, consumers, etc.) may utilize user computing devices 704(1)-(N) (collectively, user devices 704) to access a browser application 706 or a user interface (UI) accessible through the browser application 706, via one or more networks 708 to request content about item deals, search item deals, and order an item or service associated with an item deal as described herein. The "browser application" 706 can be any browser control or native application that can access and display a network page or other information such as a user interface of a native software application for enabling the selection or interaction of content about item deals. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein. Additionally, the memory 710 may include one or more modules for implementing the features described herein including the traffic shaping module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, etc. The service provider computers 714 may implement or be an example of the service provider computer(s) 122 of FIGS. 1 and 2. The one or more service provider computers 714 may also be operable to provide site hosting, computer application development, and/or implementation platforms, combinations of the foregoing, or the like to the one or more users 702.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the traffic shaping module 730. In accordance with at least one embodiment, the traffic shaping module 730 may be configured to at least generate a score for a plurality of items that represents a likelihood of a consumer ordering said item, rank the item deals or items based on the score, maintain one or more thresholds associated with a velocity rate of check-out requests for the item deals offered by an electronic marketplace, implement the processing of said check-out requests, maintain and invoke various traffic shaping levers including the sampling lever, the shifting lever, and calculating the cost function score, as well as generating data objects that have had the sampling or shifting lever performed on them for transmittal to a user device 704 for presentation to a user 702.

Figure 8:
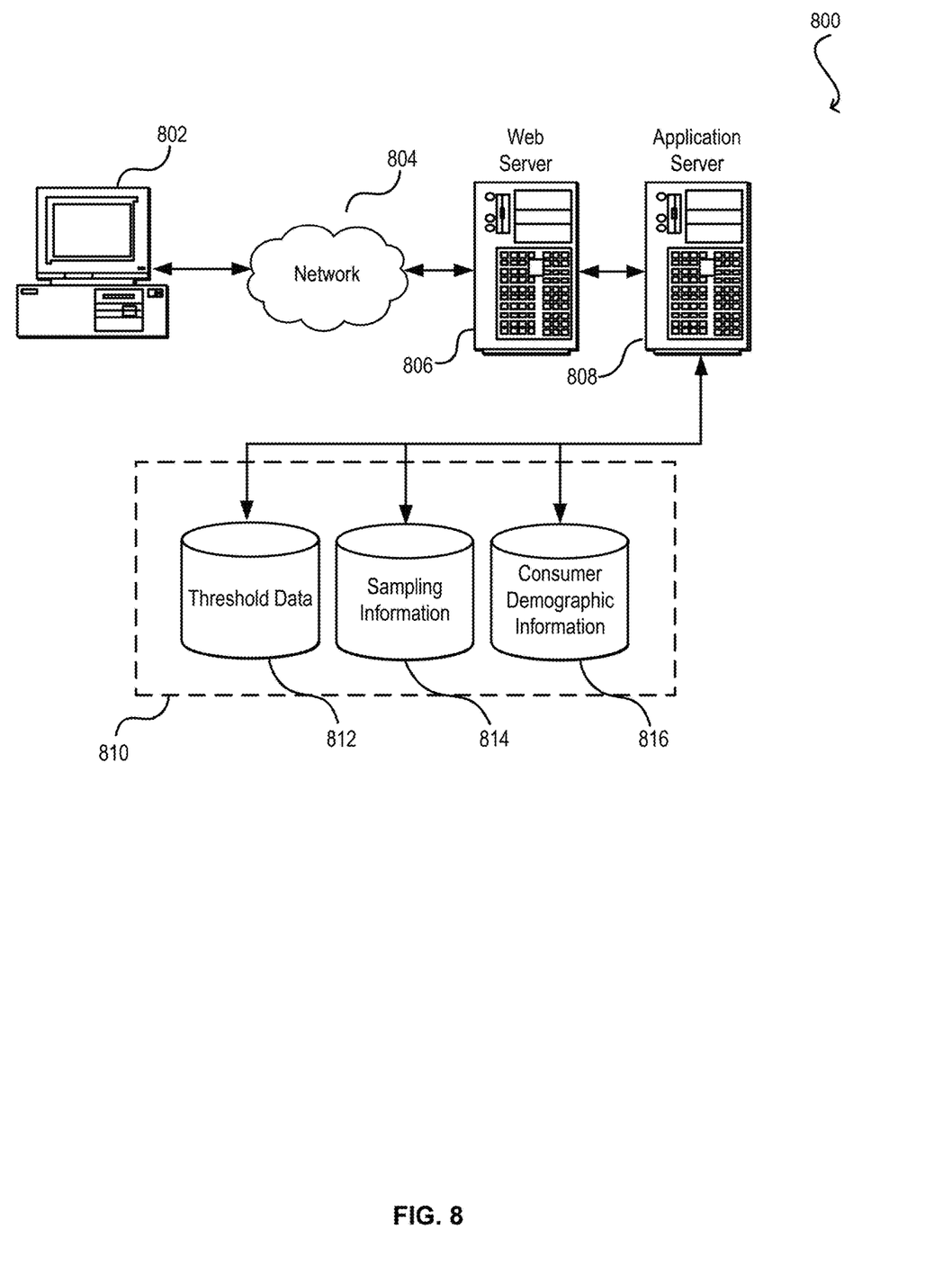
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing threshold data 812 and consumer demographic information 816, which can be used to serve content for the production side including dynamically shaping traffic requests to components utilized to process and provide item order and services offered by an electronic marketplace or similar entity. The data store also is shown to include a mechanism for storing sampling information 814, which can be used for reporting, analysis, or other such purposes such as generating rules or policies that identify sample rates or percentages that should be used when sampling or partitioning item deals into one or more number of groups or partitions in accordance with a traffic shaping feature described herein. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system and from a user device, a request for content that includes information about a plurality of items offered by an electronic marketplace;
   generating, by the computer system, a respective score for items of the plurality of items that represents a likelihood that a consumer will purchase an item;
   obtaining, by the computer system and from a server of the electronic marketplace, data identifying that a velocity of check-out requests are exceeding a threshold, the threshold associated with server health of the server processing the check-out requests;
   modifying, by the computer system, the respective scores for the items of the plurality of items based at least in part on a cost function score, the cost function score determined based at least in part on one or more of a return cost, mark down cost, storage cost, or storage space assignment;
   ranking, by the computer system, the plurality of items based at least in part on the modified respective scores;
   identifying, by the computer system, a subset of items of the ranked plurality of items to partition into a first number of groups based at least in part on the data and the request for content;
   obtaining, by the computer system, a predicted velocity of check-out requests based at least in part on historical check-out requests data;
   determining, by the computer system, that the predicted velocity of check-out requests and the velocity of check-out requests exceeds the threshold;
   generating automatically, by the computer system and in response to determining that the predicted velocity of check-out requests and the velocity of check-out requests exceeds the threshold, a data object that includes one or more items of the plurality of items included in a group of the first number of groups based at least in part on the data, the data object configured to present only a portion of the one or more items at a time via a user interface of the user device to reduce the velocity of check-out requests;
   shifting, by the computer system, an order of presentation of each item in the one or more items of the data object from an initial order of presentation by a second number of positions based at least in part on the data and the request for content to generate a second order of presentation, the second order of presentation configured to present, via the data object, the portion of the one or more items in positions that were previously reserved for another portion of the one or more items thereby causing a user to interact with the data object to search for particular items of the one or more items;
   transmitting, by the computer system to the user device, the data object for presentation utilizing the second order of presentation and via the user interface; and
   receiving, by the computer system and from the server of the electronic marketplace, updated data identifying that the velocity of the check-out requests are below the threshold thereby indicating that the velocity of the check-out requests for the server is reduced.

2. The computer-implemented method of claim 1, wherein the first number of groups is specified by an entity associated with the electronic marketplace.

3. The computer-implemented method of claim 1, wherein the first number of groups is determined based at least in part on the data.

4. The computer-implemented method of claim 1, wherein the second number is specified by an entity associated with the electronic marketplace.

5. A computer system comprising:
a memory configured to store computer-executable instructions; and
a processor in communication with the memory configured to execute the computer-executable instructions to at least:
maintain first information identifying a ranking for a plurality of items, the ranking based at least in part on a score, the score representing a likelihood of a consumer ordering a respective item of the plurality of items;
obtain, from a computer resource, second information about a velocity of requests received by the computer resource exceeding a threshold, the threshold associated with the computer resource processing the requests;
modify respective scores for the plurality of items based at least in part on a cost function score, the cost function score determined based at least in part on one or more of a return cost, mark down cost, storage cost, or storage space assignment;
update the ranking for the plurality of items based at least in part on the modified respective scores;
obtain a predicted velocity of check-out requests based at least in part on historical check-out requests data;
determine that the predicted velocity of check-out requests and the velocity of check-out requests exceeds the threshold;
generate automatically, and in response to determining that the predicted velocity of check-out requests and the velocity of check-out requests exceeds the threshold, and further in response to receiving a request for content, a data object that includes one or more items of the plurality of items, the second information, the predicted velocity of check-out requests, and the threshold, the data object configured to present only a portion of the one or more items via a user interface to reduce the velocity of requests;
update an order of presentation of each item of the portion of the one or more items in the data object by shifting the order of presentation for each item from an initial order of presentation by a certain number of positions based at least in part on the second information to generate a second order of presentation, the second order of presentation configured to present, via the data object, the portion of the one or more items in positions that were previously reserved for another portion of the one or more items thereby causing a user to interact with the data object to search for particular items of the one or more items;
transmit, to a requestor associated with the request for content, the data object for presentation utilizing the second order of presentation; and
receive, from the computer resource, updated second information identifying that the velocity of requests are below the threshold thereby indicating that the velocity of the requests received by the computer resource is reduced.

6. The computer system of claim 5, wherein the processor is further configured to transmit the data object to the requestor upon expiration of a certain time period, the certain time period determined based at least in part on the second information.

7. The computer system of claim 5, wherein shifting the order of presentation by the certain number of positions is further based at least in part on third information associated with the requestor for the request for content that identifies participation in a particular program implemented by an electronic marketplace that provides the plurality of items.

8. The computer system of claim 5, wherein the processor is further configured to update the first information based at least in part on consumer segmentation information obtained from consumer behavior associated with an electronic marketplace that provides the plurality of items.

9. The computer system of claim 5, shifting the order of presentation by the certain number of positions is further based at least in part on consumer segmentation information associated with the requestor for the request for content, the consumer segmentation information obtained from an electronic marketplace that provides the plurality of items.

10. The computer system of claim 5, wherein the processor is further configured to transmit the data object to a social media platform, wherein the data object is configured to further update the order of presentation for each item based at least in part on the updated second information about the velocity of requests received about the plurality of items.

* * * * *